W. C. FARNUM.
CUTTER.
APPLICATION FILED MAY 24, 1917.

1,295,976.

Patented Mar. 4, 1919.
2 SHEETS—SHEET 1.

Inventor:
William C. Farnum,
by Robt. P. Haines
Attorney

W. C. FARNUM.
CUTTER.
APPLICATION FILED MAY 24, 1917.
1,295,976.
Patented Mar. 4, 1919.
2 SHEETS—SHEET 2.
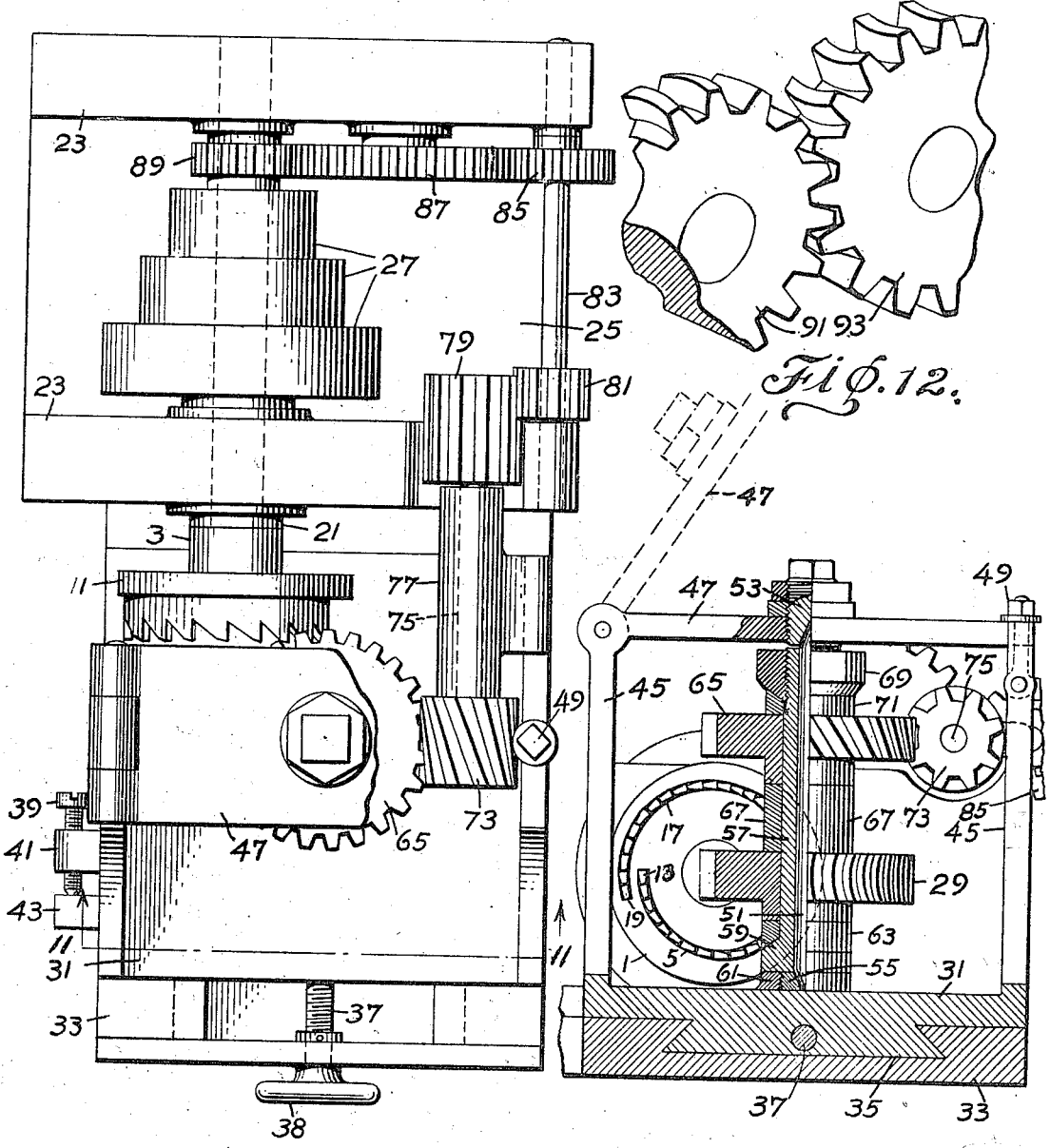
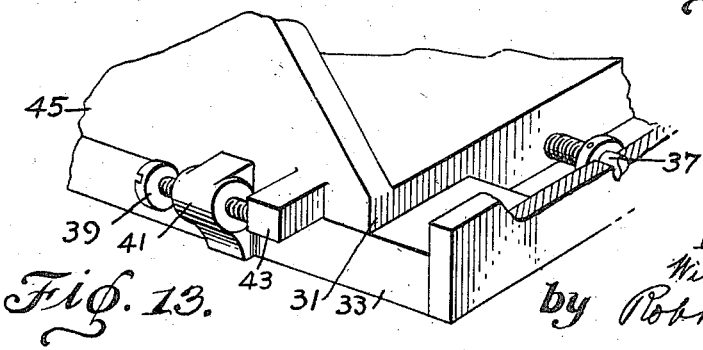
Inventor
William C Farnum,
by Robt P Harris.
Attorney

UNITED STATES PATENT OFFICE.

WILLIAM C. FARNUM, OF WINCHENDON, MASSACHUSETTS.

CUTTER.

1,295,976.

Specification of Letters Patent.

Patented Mar. 4, 1919.

Application filed May 24, 1917. Serial No. 170,660.

*To all whom it may concern:*

Be it known that I, WILLIAM C. FARNUM, a citizen of the United States, residing at Winchendon, county of Worcester, and State of Massachusetts, have invented an Improvement in Cutters, of which the following description, in connection with the accompanying drawings, is a specification, like characters on the drawings representing like parts.

The invention hereinafter described relates to cutters, and more particularly to spiral or scroll cutters for forming teeth of gears and for other purposes.

The usual spiral cutter for forming curved teeth of gears is so constructed that it cuts the concave profile of a tooth on an arc having a radius shorter than the radius of the arc of the convex profile of the tooth. As a consequence, when two such gears intermesh, the convex profile of a tooth of one of the gears will not accurately fit and conform to the contour of the concave profile of a tooth of the other gear, and the full strength of the teeth is not utilized in the transmission of power.

One of the objects of the present invention is to provide a spiral cutter whereby teeth are formed, each having concave and convex profiles of the same curvature. The construction of the curved teeth produced is such that the teeth of intermeshing gears may accurately engage throughout the entire extent of the arcs crossing their pitch circles and gears with powerful transmission, long life and quiet operation are assured.

The usual spiral cutter is so constructed that it makes cuts simultaneously on the concave and convex profiles of the teeth.

Another object of the invention is to provide a spiral cutter which makes a cut along one profile and then along the other profile. In other words, the concave and convex cuts are made progressively. However, both cuts may be made in one rotation of the cutter, so that the teeth of the desirable character described are formed without loss in time.

The character of the invention may be best understood by reference to the following description of one good form thereof shown in the accompanying drawings, wherein:—

Fig. 10 is a plan of a machine for supporting and operating the cutter and blank for the production of teeth on the latter;

Fig. 11 is a vertical section taken on line 11—11 of Fig. 10 the gear blank and master gear being shown partly in section and partly in elevation;

Fig. 12 is a perspective view of a pair of intermeshing gears having curved teeth produced by the cutter described herein; and Fig. 13 is a perspective view of portions of the table and bed showing a device for limiting movement of the former along the latter.

Figure 1:
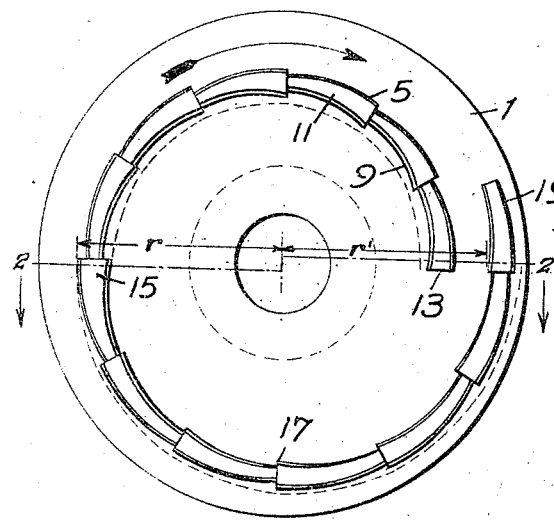
Figure 1 is a front elevation of a spiral cutter shown herein as embodying the invention.

Referring to the drawings;—the cutter shown therein as embodying the invention comprises a disk head 1 (Figs. 1 and 2) having a hub 3 internally threaded to permit the same to be secured to a suitable driving spindle. On this head is mounted means for forming the concave and convex profiles of curved teeth.

To cut the concave profiles of the teeth, in the present instance of the invention, a cutter 5 is provided on said head comprising a series of teeth, each having a forward cutting edge 9 and a body 11 tapered rearward to furnish clearance. A leading tooth 13 and a final tooth 15 mark the limits of the series of teeth of the cutter 5 which may extend along an arc of substantially 180°.

The outer edges of the teeth are adapted to cut the concave profile of the tooth in a blank, and are on radii progressively increasing in length from the leading to the final tooth of the series. The radius $r$ of the final tooth determines the radius of the concave profile of the tooth.

To cut the convex profiles of the teeth, in the present instance of the invention, a cutter 17 is provided on said head and comprising a series of teeth having forward cutting edges and tapered bodies similar to the teeth of the cutter for forming the concave profiles of a tooth. The final tooth 15 of the cutter for making the concave profiles of the teeth may constitute the leading tooth of the cutter for making the convex profiles of the teeth. The final tooth 19 marks the other limit of the cutter, which also may extend along an arc of substantially 180°. The inner edges of these teeth cut the convex profiles of the teeth and are on radii progressively increasing in length from the leading to the final tooth of the series, but the radius $r'$ of the final tooth 19, of the convex profile cutter equals the radius $r$ of the final tooth 15 of the concave profile cutter. Since the teeth 15 and 19 make the final cuts in producing the concave and convex profiles respectively of a tooth, and are of equal radii, it follows that the curvature of the arcs of said concave and convex profiles will be the same.

The concave profile forming cutter and the convex profile forming cutter, in the present instance of the invention, are mounted on the same head, and are progressively disposed, so that they make cuts successively along the concave and convex profiles, but complete cuts are made on both profiles once in each rotation of the head.

It will be noted that the outer edges of the teeth of the concave cutter 5 form the concave profiles of the teeth, whereas, the inner edges of the convex cutter 17 form the convex profiles of the teeth. The inner edges of the teeth of the concave cutter 5 are radially outward from the inner edges of the teeth of the convex cutter 17, and the outer edges of the teeth of the convex cutter are radially inward from the outer edges of the teeth of the concave cutter. As a result, the outer edges of the teeth of the concave cutter and the inner edges of the teeth of the convex cutter, are the only edges which are active in forming the concave and convex profiles of the teeth.

The concave and convex cutters, in the present instance of the invention, are arranged on the head with one as a continuation of the other and forming parts of the same spiral, but so far as either operation is concerned, they are in effect, separate cutters. The form of the cutters in the selected embodiment of the invention, is a spiral but not necessarily a spiral of Archimedes, since various forms may be adopted, provided the radii of the final teeth of the two cutters are equal to produce final cuts on the concave and convex profiles of the teeth with the same curvature.

Suitable means may be provided for supporting and rotating the cutter. In the present instance of the invention, it is mounted on a spindle 21 (Fig. 10) journaled in bearings in uprights 23 on a standard 25, said spindle being adapted to be driven at different speeds by stepped belt pulleys 27.

The cutter may be used to produce teeth in different articles. In the present exemplification of the invention, it is shown as used for cutting curved teeth in spur gears.

The gear blank 29 (Figs. 10 and 11) is supported in a horizontal plane transversely to the plane of the cutter. To accomplish this, a table 31 is mounted on a bed 33 supported on the standard and provided with a dove-tailed projection 35 adapted to slide in a similarly shaped guideway in said bed to allow the table to be moved in a direction parallel to the axis of the spindle. To feed the table, the usual screw 37 having a hand wheel 38 may be threaded in said table and confined against axial movement relative to said bed. Inward movement of the table toward the cutter may be limited by a screw 39 (Figs. 10 and 13) threaded in an ear 41 projecting from said bed and adapted to engage a lug 43 projecting from said table in line with said screw.

To position the blank on the table, the latter is provided with uprights 45 (Fig. 11) having a bridge-bar 47 hinged to one and adapted to be locked to the other by a swing bolt 49.

A mandrel 51 is vertically disposed between said uprights, and has conical ends adapted to set in conical bearings in an upper plug 53 threaded in said bridge-bar, and in a lower plug 55 threaded in said table. The upper plug may be adjusted to take up wear and secure the mandrel accurately in position without lost motion.

The gear blank may be mounted on a sleeve 57 on said mandrel, said sleeve having a foot 59 adapted to rest against the upper end of a boss bearing 61 projecting somewhat above said table. The gear blank may be supported the appropriate distance above the table to be acted upon by the cutter by a spacing washer 63 interposed between the foot of the sleeve and the lower face of the blank.

As the spiral cutter is rotated, it is essential that the gear blank should be rotated. When a spiral cutter such as shown herein is employed, it is necessary to rotate the blank a distance equal to the pitch of a tooth to be formed on the blank, in the course of each rotation of the cutter, and since the cutter is rotated continuously, the blank should be rotated continuously.

To rotate the blank as described, a master gear 65 (Figs. 10 and 11) may be mounted on the sleeve sustaining the blank, and may be spaced from the blank by a washer 67. To secure the blank and master gear to the sleeve, a nut 69 may be threaded on said sleeve adjacent the top thereof, and engage the upper end of a washer 71 interposed between said nut and master gear. When the nut is adjusted toward the foot of the sleeve, it will confine the blank, the master gear, and the spacing washers between them. Consequently, rotation of the master gear will be shared by the blank.

Suitable means may be provided for driving the master gear. In the present instance of the invention, this may be accomplished by a spiral gear 73 (Figs. 10 and 11) fast on one end of a shaft 75 journaled in a bearing 77 mounted on the table referred to. An elongated gear 79 fast on the opposite end of said shaft meshes with a pinion 81 fast on a shaft 83 journaled in bearings in the uprights 23 referred to. The shaft 83 may be driven by a gear 85 fast thereon meshing with an idler gear 87 mounted on a stud shaft carried by one of the uprights 23, said idler gear being driven by a pinion 89 on the cutter spindle 21.

By the gear train described, the master gear may be conveniently driven from the cutter spindle. When the table is fed toward the cutter, the elongated gear 79 may slide along the gear 81 without loss of engagement therewith, so that the automatic driving of the master gear may continue without interruption while the table is fed toward the cutter.

In operation, the bridge-bar 47 is swung to its position shown in dotted lines in Fig. 11, and the sleeve with the gear blank and master gear secured thereto is slid down onto the mandrel, and the bridge-bar is secured in its position shown in full lines in Fig. 11. Then the spindle is rotated, thereby rotating the cutter and the blank.

Figure 3:
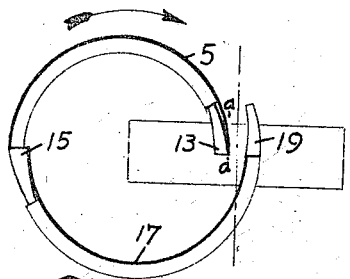
Figs. 3, 4 and 5 are diagrammatic views illustrating the operation of the cutter in forming curved teeth on a gear blank.
Figure 4:
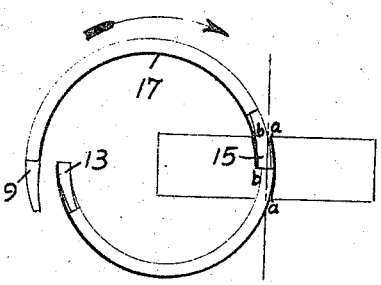
Figure 5:
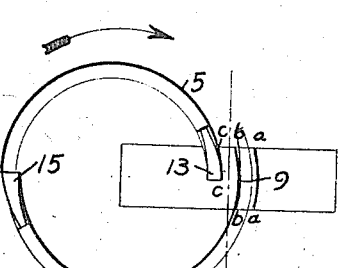

Comprehension of the operation of the cutter may be facilitated by reference to the cycle of its operations illustrated in Figs. 3, 4 and 5. In Fig. 3 the concave cutter 5 is shown with its leading tooth 13 starting to cut the concave profile of a tooth along the arc $a-a$. In Fig. 4 the cutter has rotated through an arc of 180°, thereby causing the series of teeth of the concave cutter 5 to perform their cuts, and bringing the final tooth 15 to the position formerly occupied by the leading tooth 13. The final tooth is now completing the cut along the concave profile of the tooth and on the radius $r$ referred to.

The inner edge of the final tooth 15 constitutes a part of the convex cutter 17, and is shown commencing the convex cut along line $b-b$ in Fig. 4. When the cutter rotates through an arc of 180°, the leading tooth and the final tooth of the convex cutter are carried around to their positions shown in Fig. 5, where the final tooth is shown completing the cut along the convex profile of the tooth on line $c-c$.

This marks the completion of concave and convex profile cuts, and brings the concave cutter 5 back to the position which it had at the commencement of the cycle. It will be noted that as the final tooth of the convex cutter is completing its cut, the leading tooth of the concave cutter is commencing a new concave cut along the line $c-c$.

The final tooth of the convex cutter completes its cut on the radius $r'$, which as stated, is equal to the radius $r$, and consequently, the arcs of the concave and convex profiles of the tooth have the same curvature.

The cycle of operations performed by the cutter during one rotation thereof, has just been described. The blank is rotated an increment equal to a pitch of one tooth to be cut on the gear blank by rotation of the blank through the master gear and the train of gears described, it being understood, that said train is appropriately designed to transmit the proper increment of rotation to the gear blank during one rotation of the cutter.

The cutter and the gear blank will continue to rotate until teeth have been partially formed throughout the circumference of the blank. Then the table may be fed inward toward the cutter, in order to produce deeper cuts in the blank. The table may be fed on and in toward the cutter until teeth in the blank of the required depth are completed. The screw 39 may be adjusted to engage the stop lug 43 on the table at the proper time to automatically insure cutting teeth of the requisite depth.

The rotation of the gear blank and increment equal to the pitch of a tooth to be formed on the blank, serves to bring the blank progressively in relation to the cutter to generate involute teeth.

Figure 6:
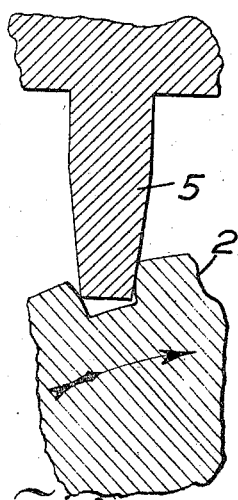
Figs. 6, 7, 8 and 9 are views showing the relative positions of the cutter and gear blank in the course of the generation of involute gears.
Figure 7:
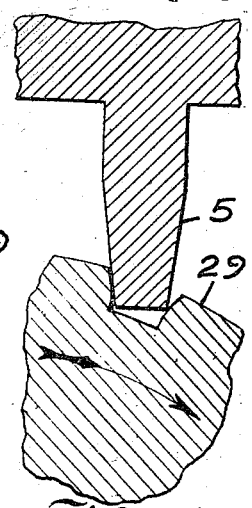
Figure 8:
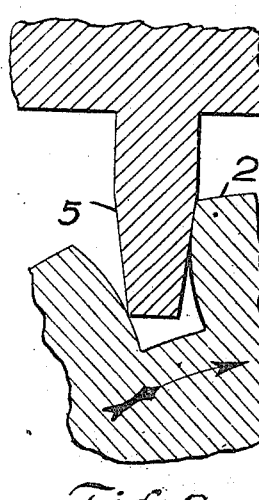
Figure 9:
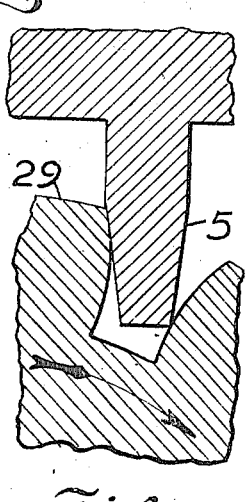

This operation is illustrated in the diagrams shown in Figs. 6, 7, 8 and 9. In Fig. 6 the cutter is shown commencing to enter the blank. In Fig. 7 the blank is shown in its position after it is rotated a distance equal to the pitch of the tooth, thereby partially producing the curved profiles. In Fig. 8 the blank is shown fed sufficiently in toward the cutter to produce teeth of the required depth. In Fig. 9 the blank is shown in its position after being rotated a distance equal to the pitch of the tooth, thereby completing the involute profile of the tooth.

After the teeth have been cut throughout the circumference of the blank, the machine is arrested, the bridge-bar is released, and the master gear, and the gear thus formed are removed from their supporting sleeve.

It will be apparent that by the cutter described, curved teeth may be quickly and perfectly formed, each having convex and concave profiles cut on arcs of the same curvature. The uniform identical construction of the teeth as described, enables a pair of such gears, for example, the gears 91 and 93 (Fig. 12) to accurately mesh with the convex profiles of the teeth of one of the gears engaging throughout the lengths of the concave profiles of the other gear. As a result, the full power of the teeth is utilized, the life of the gears is prolonged, and quiet operation is assured.

Figure 2:
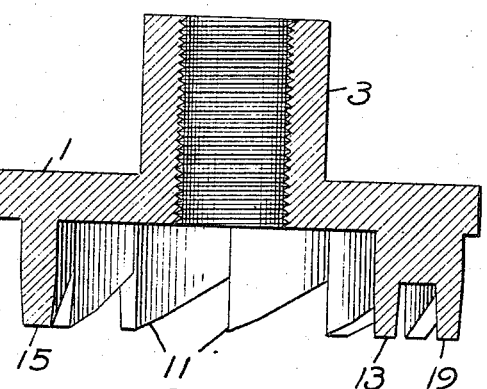
Fig. 2 is a horizontatl section of the cutter shown in Fig. 1.

The active profile forming edges of the teeth of the concave and convex forming cutters, in the present instance of the invention, are substantially true spirals, while the opposite edges of said cutters are offset outwardly and inwardly from continuations of said spirals indicated by broken lines in Fig. 1.

The cutter may not only be used to produce curved teeth of gears such as described, but also may be used to produce curved teeth on beveled gears and teeth on devices for other purposes as desired.

It will be understood that the invention is not limited to the specific embodiment shown, but that various deviations may be made therefrom, without departing from the spirit and scope of the appended claims.

Claims:

1. A cutter comprising a member having a spiral cutter thereon for forming a concave profile of a tooth in a blank, and a spiral cutter on said member for forming a convex profile of said tooth.

2. A cutter comprising a member having a spiral cutter thereon for forming a concave profile of a tooth in a blank, and a spiral cutter on said member for forming a convex profile of said tooth with the same curvature as said concave profile.

3. A cutter comprising a member having spiral cutters thereon, one for cutting the concave profile of a tooth in a blank, and the other for cutting the convex profile of said tooth, said cutters having portions of equal radii for producing concave and convex profiles of the same curvature.

4. A cutter comprising a member having spiral toothed cutters thereon, one for forming a concave profile of a tooth in a blank, and the other for forming a convex profile of said tooth with the same curvature as said concave profile.

5. A cutter comprising a member having spiral cutters thereon for forming concave and convex profiles of a tooth in a blank, said cutters being progressively disposed on said member for making their cuts successively.

6. A cutter comprising a member having spiral cutters thereon for forming concave and convex profiles of a tooth in a blank, respectively, said cutters being relatively arranged on said head for making successive cuts in the course of one rotation of said member.

7. A cutter comprising a member having spiral cutters thereon for forming concave and convex profiles of a tooth in a blank, one of said cutters being radially offset from the other.

8. A cutter comprising series of spirally arranged teeth progressively disposed, one series for forming the concave profile and the other series for forming the convex profile of a tooth.

9. A cutter comprising series of teeth spirally disposed, one of said series having outer edges for cutting the concave profile of a tooth and the other of said series having inner edges for cutting the convex profile of the tooth.

10. A cutter comprising series of spirally disposed teeth, one of said series having outer edges for cutting the concave profile of a tooth and the other of said series having inner edges for cutting the convex profile of the tooth, said series having inactive edges opposed to said cutting edges.

11. A cutter comprising series of spirally disposed teeth, one of said series having outer edges for cutting the concave profile of a tooth and the other of said series having inner edges for cutting the convex profile of the tooth, said first named series having inner edges radially outward from the inner edges of the second series, and the second series having outer edges radially inward from the outer edges of the first series.

12. A cutter comprising a pair of circumferentially disposed cutters for progressively forming the concave and convex profiles of a tooth and having portions of equal radii for producing said profiles on arcs of the same curvature.

13. A cutter comprising series of circumferentially disposed cutting teeth for forming the concave and convex profiles of a tooth, the teeth of each series having progressively increasing radii, and the final teeth of both series having equal radii for finishing said profiles with the same curvature.

In testimony whereof, I have signed my name to this specification,

WILLIAM C. FARNUM.